(12) United States Patent
Cheluvaraju et al.

(10) Patent No.: US 12,333,831 B2
(45) Date of Patent: Jun. 17, 2025

(54) IMAGE BASED COMMAND CLASSIFICATION AND TASK ENGINE FOR A COMPUTING SYSTEM

(71) Applicant: MICROSOFT TECHNOLOGY LICENSING, LLC, Redmond, WA (US)

(72) Inventors: Bharath Cheluvaraju, Bangalore (IN); Saheel Ram Godhane, Warud (IN); Nishan Hassan, Delhi (IN); Sheetal Shamsher Sethi, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 536 days.

(21) Appl. No.: 17/566,995

(22) Filed: Dec. 31, 2021

(65) Prior Publication Data

US 2023/0215198 A1 Jul. 6, 2023

(51) Int. Cl.
G06V 30/10 (2022.01)
G06F 3/048 (2013.01)
(Continued)

(52) U.S. Cl.
CPC .............. *G06V 30/10* (2022.01); *G06F 3/048* (2013.01); *G06F 3/0481* (2013.01);
(Continued)

(58) Field of Classification Search
CPC ...... G06V 30/10; G06V 10/40; G06V 10/454; G06V 10/82; G06V 20/20; G06V 20/70;
(Continued)

(56) References Cited

U.S. PATENT DOCUMENTS 9,911,034 B2 3/2018 Chulinin
9,923,991 B2 3/2018 Lai et al.
(Continued)

FOREIGN PATENT DOCUMENTS

CN 112101165 A 12/2020
WO WO-2017205305 A1 * 11/2017 ........... G06F 3/0481

OTHER PUBLICATIONS

"International Search Report and Written Opinion Issued in PCT Application No. PCT/US22/045957", Mailed Date: Feb. 7, 2023, 13 Pages.
(Continued)

*Primary Examiner* — Amandeep Saini
*Assistant Examiner* — Daniella M. DiGuglielmo
(74) *Attorney, Agent, or Firm* — Shook, Hardy & Bacon L.L.P.

(57) ABSTRACT

Provided are methods, systems, and computer storage media for determining a command (e.g., intent) of an image based on image data features. A task associated with the determined command is generated based on a portion of the image data features. Task entities corresponding to the task are determined. The task and the corresponding task entities are generated and configured for use in a computer productivity application. Accordingly, present embodiments provide for generating command-specific tasks and task entities that may be integratable for use in a computer productivity application.

19 Claims, 10 Drawing Sheets

(51) Int. Cl.

| | |
|---|---|
| *G06F 3/0481* | (2022.01) |
| *G06F 3/0482* | (2013.01) |
| *G06N 3/0455* | (2023.01) |
| *G06N 3/048* | (2023.01) |
| *G06N 3/09* | (2023.01) |
| *G06N 7/01* | (2023.01) |
| *G06Q 10/10* | (2023.01) |
| *G06V 10/40* | (2022.01) |
| *G06V 10/44* | (2022.01) |
| *G06V 10/82* | (2022.01) |
| *G06V 20/20* | (2022.01) |
| *G06V 20/70* | (2022.01) |
| *G06V 30/413* | (2022.01) |

(52) U.S. Cl.
CPC ......... *G06F 3/0482* (2013.01); *G06N 3/0455* (2023.01); *G06V 10/40* (2022.01); *G06V 10/82* (2022.01); *G06V 30/413* (2022.01); *G06N 3/048* (2023.01); *G06N 3/09* (2023.01); *G06N 7/01* (2023.01); *G06Q 10/10* (2013.01); *G06V 10/454* (2022.01); *G06V 20/20* (2022.01); *G06V 20/70* (2022.01)

(58) Field of Classification Search
CPC ...... G06V 30/413; G06N 7/01; G06N 3/0455; G06N 3/048; G06N 3/09; G06F 3/048; G06F 3/0481; G06F 3/0482; G06Q 10/10
See application file for complete search history.

(56) References Cited

U.S. PATENT DOCUMENTS

| | | | | |
|---|---|---|---|---|
| 10,223,586 | B1* | 3/2019 | Leibovitz | G06V 30/416 |
| 10,860,854 | B2 | 12/2020 | Anorga et al. | |
| 10,963,505 | B2 | 3/2021 | Adlersberg et al. | |
| 11,087,086 | B2 | 8/2021 | An et al. | |
| 2012/0304060 | A1* | 11/2012 | Kompalli | G06F 40/10 715/709 |
| 2017/0064035 | A1* | 3/2017 | Lai | H04L 67/306 |
| 2018/0336415 | A1* | 11/2018 | Anorga | G06N 20/00 |
| 2020/0082345 | A1* | 3/2020 | MacBeth | G06Q 10/109 |
| 2021/0192202 | A1* | 6/2021 | Tripuraneni | G06V 30/413 |

OTHER PUBLICATIONS

"ATIS DataSet from MS CNTK", Retrieved From: http://web.archive.org/web/20210126225547/https://www.kaggle.com/siddhadev/atis-dataset-from-ms-cntk, Jan. 26, 2021, 2 Pages.

"CONLL Corpora", Retrieved From: http://web.archive.org/web/20210124200202/https://www.kaggle.com/www.kaggle.com/nltkdata/conll-corpora, Jan. 24, 2007, 2 Pages.

"CRF Layer on the Top of BILSTM-1", Retrieved From: https://createmomo.github.io/2017/09/12/CRF_Layer_on_the_Top_of_BiLSTM_1/, Sep. 12, 2017, 7 Pages.

"How to use OCR", Retrieved From: https://help.thecookbookapp.com/hc/en-gb/articles/360002691375-How-to-use-OCR, Feb. 25, 2021, 5 Pages.

"Language Understanding (LUIS) Documentation", Retrieved From: https://docs.microsoft.com/en-us/azure/cognitive-services/luis/, Jan. 26, 2021, 545 Pages.

"Machine Learning for Mobile Developers", Retrieved From: http://web.archive.org/web/20210918011811/https://developers.google.com/ml-kit, Sep. 18, 2021, 6 Pages.

"Named Entity Recognition: Concept, Tools and Tutorial", Retrieved From: https://monkeylearn.com/blog/named-entity-recognition/, Oct. 21, 2021, 13 Pages.

"Natural Language Toolkit", Retrieved From: https://www.nltk.org/, Retrieved Date: Nov. 17, 2018, 2 Pages.

"Scikit-Learn: Machine Learning in Python", Retrieved From: https://scikit-learn.org/stable/, Jan. 3, 2021, 2 Pages.

"Sklearn Feature Extraction Text.TfidfVectorizer", Retrieved From: https://scikit-learn.org/stable/modules/generated/sklearn.feature_extraction.text.TfidfVectorizer.html, Jan. 20, 2021, 7 Pages.

"Sklearn Model Selection GridSearchCV", Retrieved From: https://scikit-learn.org/stable/modules/generated/sklearn.model_selection.GridSearchCV.html?highlight=gridsearchcv#sklearn.model_selection.GridSearchCV, Dec. 5, 2020, 8 Pages.

"Sklearn Multioutput ClassifierChain", Retrieved From: https://scikit-learn.org/stable/modules/generated/sklearn.multioutput.ClassifierChain.html?highlight=classifierchain#/sklearn.multioutput.ClassifierChain, 4 Pages.

"sklearn.ensemble. RandomForestClassifier", Retrieved From: http://web.archive.org/web/20210308073211/https://scikit-learn.org/stable/modules/generated/sklearn.ensemble.RandomForestClassifier.html, Mar. 8, 2021, 7 Pages.

"Sklearn.Svm.SVC", Retrieved From: https://scikit-learn.org/stable/modules/generated/sklearn.svm.SVC.html?highlight=svc#sklearn.svm.SVC, Jan. 22, 2021, 8 Pages.

"The Easiest Way to Organize Your Recipes", Retrieved From: https://recipekeeperonline.com/, Jan. 19, 2021, 13 Pages.

"Viterbi Algorithm", Retrieved From: Viterbi Algorithm, 2016, 14 Pages.

Chen, et al., "BERT for Joint Intent Classification and Slot Filling", In Repository of arXiv:1902.10909v1, Feb. 28, 2019, 6 Pages.

Li, et al., "Dice Loss for Data-imbalanced NLP Tasks", Retrieved From: In Repository of arXiv:1911.02855v3, Aug. 29, 2020, 12 Pages.

Lin, et al., "Focal Loss for Dense Object Detection", In Repository of arXiv:1708.02002v2, Feb. 7, 2018, 10 Pages.

Marcus, Stacy, "Create a Task by Taking a Photo", Retrieved From: https://help.workframe.com/en/articles/2020470-create-a-task-by-taking-a-photo, Oct. 11, 2021, 4 Pages.

Rosebrock, Adrian, "OCR a document, form, or invoice with Tesseract, OpenCV, and Python", Retrieved From: https://www.pyimagesearch.com/2020/09/07/ocr-a-document-form-or-invoice-with-tesseract-opencv-and-python/, Sep. 7, 2020, 35 Pages.

Sean, Endicott, "You Can Now Create a Task in Microsoft to Do by Sharing an Image on Android", Retrieved From: https://www.windowscentral.com/you-can-now-create-task-microsoft-do-android-sharing-image, May 6, 2021, 8 Pages.

Wisley, Connie, "6 Best Receipt OCR Software for Easy Receipt Filing and Tracking", Retrieved From: https://www.cisdem.com/resource/receipt-ocr.html, Feb. 28, 2020, 9 Pages.

Xu, Yiheng, "LayoutLM: Pre-training of Text and Layout for Document Image Understanding", In Repository of arXiv:1912.13318v5, Jun. 16, 2020, 9 Pages.

Zelic, Filip, "A comprehensive guide to OCR with Tesseract, OpenCV and Python", Retrieved From: https://hanonets.com/blog/ocr-with-tesseract/, Jan. 8, 2021, 42 Pages.

"The Cookbook App", Retrieved From: https://thecookbookapp.com/, Jan. 27, 2021, 4 Pages.

* cited by examiner

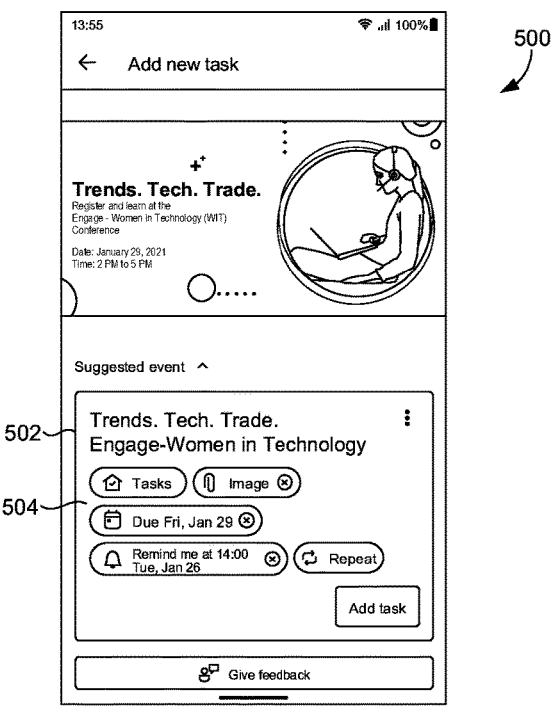
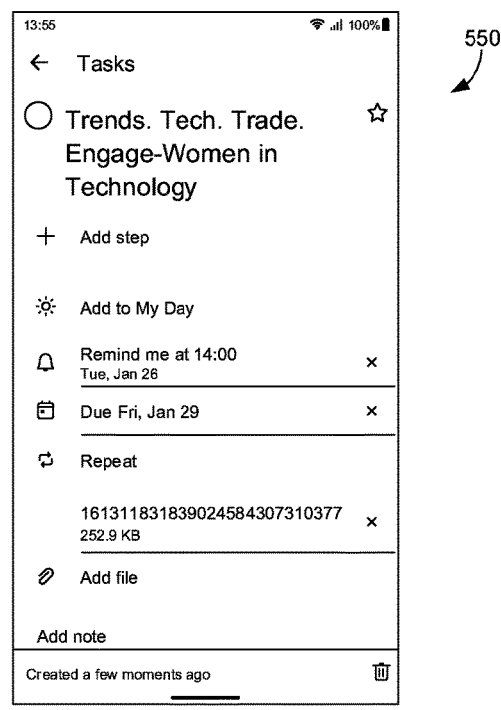
FIG. 5A
FIG. 5B

IMAGE BASED COMMAND CLASSIFICATION AND TASK ENGINE FOR A COMPUTING SYSTEM

BACKGROUND

Computer-implemented technologies can assist users in employing various productivity tools. Example productivity tools include computer applications or services such as calendar applications, notification systems, reminders, task-managing services, shopping lists, scheduling tools, recipe organizers, and the like. Existing productivity tools are dependent upon receipt of user inputs and/or control in order to perform operations that assist the user. As an example, a user may want to create a calendar entry based on an image; for instance, the user may see a promotion for a music concert or other event and want to remember it so that they can buy tickets or attend it. Creating a calendar entry in the user's electronic calendar application typically requires a number of operations to be performed by the user on their user computing device. For instance, the operations may require a first input by the user to open the calendar application operating on their computing device, a second input indicative of creation of a new calendar entry, a third input indicative of text describing the new calendar entry name (for example, the music concert), a fourth input indicative of a start time, a fifth input indicative of an end time, a sixth input indicative of a description for the calendar entry, and so forth. Consequently due to the number of operations required, many users choose not to use the assistive technology and instead may snap a picture or screenshot of the image (for example, the concert promotion) in hopes to remember it or to create a calendar entry at a later time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technologies described in this disclosure are directed toward computerized systems and methods for providing assistance to a user based on image data. For example, an intent or computer-implemented command (hereinafter "command") may be inferred from a digital image received by a computer system, and based on the command and the image, a task and corresponding task entity (for example, a person, place, date, or other entity associated with the task) may be determined and utilized to assist the user. In particular, an aspect of the present disclosure may include receiving an image that includes alphanumeric characters and/or non-alphanumeric character objects. Image data may be extracted from the image, based on the alphanumeric characters and/or the non-alphanumeric character objects to determine at least one image data features. Based on at least a portion of the image data features, a command is determined. In some instances, a context associated with the image is further determined. A task that corresponds to the determined command or context then may be generated (or otherwise determined and provided) based on the command, a portion of the image data features, and/or a context associated with the image. In some implementations, the task may include at least one task entities that are determined, based on the task and/or the image data features.

In this manner, the various implementations described herein provide a personalized technique to computing systems employing computer productivity applications by providing computer-generated tasks and task entities based on a predicted command associated with an image. Whereas conventional approaches fail to determine and generate tasks based on a predicted command, and instead may require extensive user interaction and/or control to generate a task in order to assist the user, aspects of the present disclosure can determine the command and generate associated tasks and task entities based on an image, while reducing client-side interactions necessary to arrive at the intended task. Accordingly, present embodiments provide an improved technologies for generating command-specific tasks that are integral for use in computer productivity applications to enhance functionality of a computer productivity application and reduce computational resources utilized by manually creating these tasks and/or manually specifying task entities.

BRIEF DESCRIPTION OF THE DRAWINGS

The technology described herein is described in detail below with reference to the attached drawing figures, wherein:

FIG. 5A is a screenshot of an example GUI designed to receive an image used to generate a command, a task, and a task entity, according to some embodiments of this disclosure;

FIG. 5B is a screenshot of an example GUI designed to receive an image used to generate a command, a task, and a task entity, according to some embodiments of this disclosure;

DETAILED DESCRIPTION OF THE INVENTION

Figure 1:
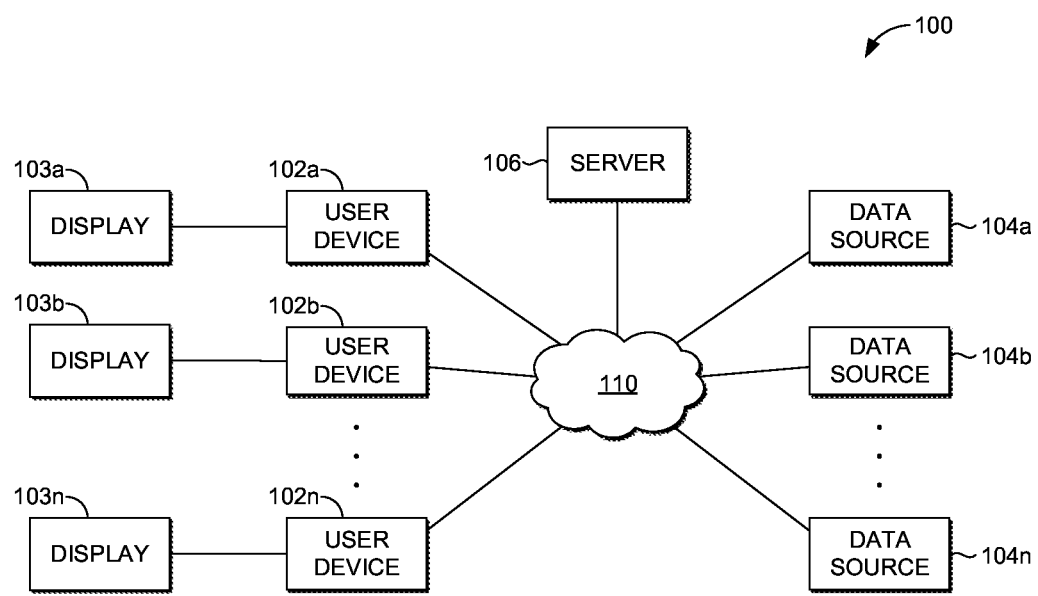
FIG. 1 is a block diagram of an exemplary computing environment suitable for use in implementing some embodiments of this disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Aspects of this disclosure are directed toward computer technologies for providing assistance to a user based on image information. For example and at a high level, an image, such as a photo or drawing created or provided by a user, may be received by a computer system and processed to determine ultimately a task to be performed by the computer system. The task may correspond to a command of the user, such as, from the earlier example of a promotion for a music concert, creating, via an electronic calendar application, a reminder to the user to purchase tickets or attend the concert. Accordingly, a command may be inferred from a digital image or image information received by a computer system, and based on the command and the image information, a task may be generated or determined. Further, in some instances, one or more corresponding task entities are also determined; for example, the date of the concert, the venue, the band(s) playing, or other entities associated with the task. The task then may be utilized by computer assistance technology to automatically assist the user, such as by performing the task or performing operations to facilitating performance of the task. Thus continuing the example of the concert, this may include, without limitation: providing a reminder to book tickets to the concert or automatically reserving tickets or purchasing the tickets; creating a calendar entry for the concert in an electronic calendar of the user; facilitating transportation to the concert (such as scheduling a ride-share app or taxi), or other operations associated with the task.

In another example, suppose the image received by the computer system is a shopping list (for instance, suppose a user snapped a photo via their mobile device of their shopping list that was written on a paper sticky note). By employing aspects of the present disclosure, the computer system may determine that the user is attempting to perform an action (for instance, generate a shopping list of items or ingredients for later retrieval to purchase) based on the image of the shopping list. Thus, the computer system may infer an intent or command indicative of generating a shopping list. Based on this command (or in some implementations based on image data features and/or an image context), a task corresponding to the inferred command may be generated (or otherwise determined). Continuing the example of the image of the shopping list, the computer system may generate a shopping list (which, in this example, corresponds to the task), which may comprise creating a new shopping list or updating an existing shopping list of the user to include the items on the received image of the shopping list.

As further described herein, some implementations of the present disclosure include determining a task entity based on a determined task, command, and/or one of more image data features, and generating a task that includes the task entity. Thus, continuing the example of the image of the shopping list, task entities may comprise, without limitation, items on the shopping list, quantities of items, and the name of store or the type of store. Based on determining the user's shopping list task and image data features, the computer system can determine, for example, specific items on the shopping list (examples of task entities). Thereafter, the computer system may generate a shopping list (in this example, the task) that includes the shopping items (in this example, task entities). The generated shopping list may be configured for consumption by a computer application such as a productivity tool, for instance, for use in a shopping application or to-do application. In one implementation, the generated shopping list task and items (task entities) can be utilized to automatically purchase the items for the user.

Accordingly, in one aspect and as further described herein, an image may be received by a computer system that includes alphanumeric characters and/or non-alphanumeric character objects. For example, the image may comprise a photo taken by a mobile device or other computing device, a screen capture created via a user device, a drawing created by a user, an image received via an electronic communication, such as email, SMS, chat application, or while browsing the Internet, such as an online advertisement. In some implementations, the image may comprise one or more frames from a video source, such as a digital video or computer animation. An alphanumeric character may include, by way of example, a number, letter, symbol, glyph, and/or any suitable character capable of communicating a message. A non-alphanumeric character object may include a shape, graphic element such as a line, photographic or image (or portion) of a person, object, location, and/or any other suitable object other than an alphanumeric character.

Image data may be extracted from the image, based on the alphanumeric characters and/or the non-alphanumeric character objects. The extracted image data may be processed to determine one or more image data features that correspond to a property or characteristic of the image or an aspect of the image. Thus the term "image data feature" may refer to a property or characteristic of the image or an aspect of the image. Image data features may be related or independent of one another, and/or may be recorded using scalar numeric values, binary values, non-binary values, and so forth. Image data features may include visual features associated with the image, as well as spatial features indicative of a position and relationship of the alphanumeric characters and/or the non-alphanumeric character objects with respect to each other. In one embodiment, the coordinates of one or more alphanumeric characters and one or more non-alphanumeric character object may be compared against each other to determine relationships between alphanumeric characters and/or the non-alphanumeric character objects. By way of example and without limitation, the image data features may include machine-encoded text information, size and/or position information, color information, relative location or proximity to other text or objects, and so forth, corresponding to the image and its corresponding alphanumeric characters and/or non-alphanumeric character objects.

Based on at least a portion of the image data features, a command is determined. In some instances, a context associated with the image is further determined. By way of example and without limitation, an image context may comprise information about the date and/or time the image was taken or created, location information in the image or available regarding the time the image was created or received, a computing application used to capture, create, or receive the image, metadata about the image such as filename, information from related images such as images created near the same time, location, similar images or images with similar subject matter or by the same user, or other contextual information associated with an image. Some implementations utilize command logic to determine the command, as described herein. A task that corresponds to the determined command or context then may be generated (or otherwise determined) based on: the command, a portion of the set of image data features, and/or the image context. In some implementations, the task may include one or more task entities that are determined, based on the task and/or the set of image data features. In some implementations, task logic may be utilized to determine the task and/or task entities, as described herein.

Accordingly, embodiments described herein provide improved technologies to computer systems for providing assistance or productivity services by, among other aspects, enabling a computer system to infer a command from an image and determine or generate a task corresponding to the command for use by a computer productivity application or service. In this way, embodiments provide new, enhanced functionality for these computer productivity applications or services and also reduce computational resources that would be required from manual operation or creation of these tasks, and/or manually specifying task entities.

As described previously, conventional computer productivity tools are dependent upon receipt of user inputs and/or control in order to perform operations that assist the user. For instance, the above example of the music concert required the user to perform a number of operations via an electronic calendar application. Consequently due to the number of operations required and sometimes further due to familiarity the user needs to have with operating a particular computer productively application or service, many users choose not to use these assistive technologies and instead resort to simpler operations such as taking a picture or screenshot, or jotting a note or a sketch on paper, in hopes to remember it and their purpose behind creating the image at a later time.

Further, such involved processes by the user also require the computing device to be with the user and may further require a computing device to remain in active operation during the performance by the user of the various operations. Remaining in active operation during this process may drain the computing resource's battery and reduce the overall productivity the computing device is able to provide. Further, these productivity computing applications and services are often configured to only accept certain types of data as input, such as typed text or a static image (for example, a picture of an item for a shopping list), and thus require the user to further input a description in order to capture the command or determine a task associated with the data provided by the user. Consequently, many users again opt out of using these conventional productivity tools in view of their various limitations.

More specifically, many users opt-in to more time-efficient alternatives to managing productivity in lieu of using certain conventional computer productivity tools. For example, a user may post physical sticky notes as reminders or for a shopping list. Similarly, a user may take a screenshot (for example, of a computer-generated image) or a picture (for example, snapped from the camera of the computing device) of the sticky notes, or of an event description to remember attending an event in lieu of entering the event into a calendar application. Additionally or alternatively, the user may take a screenshot or snap a picture of a recipe the user wants to save, an item the user intends to purchase, or any content the user otherwise intends to follow up on. The user may reference the screenshot or picture in the future to remind themselves of the event. However, this alternative picture-taking approach has shortfalls. First, the image remains unstructured data that is unable to be utilized by a computer productivity application to assist the user. Thus, the screenshot or picture may get lost in the user's picture library, or the user may altogether fail to remember to reference the screenshot or picture. Second, unlike the calendar, reminder, task manager, shopping list or other productivity applications, for example, the mere screenshot or picture fails to notify the user regarding the intention the user had when capturing the image, such as reminder the user about a calendar event (for example, via a computer-generated reminder) or to purchase the item in the picture (for example, via a computer shopping list application).

Although conventional productivity tools may be able to receive and store an image taken by the user, these technologies lack functionality to determine the command from the image in order to assist the user by carrying out operations to achieve the command. Rather these conventional technologies first require dedicated input and/or control operations to be performed by the user in order to guide the productivity tool to provide the assistance. For instance, in the above example of the image promoting the music concert, the user intended to remember the event and date so that the user can purchase tickets and attend. But a conventional electronic calendar application requires the user to perform numerous operations to remember the music concert and date, as described previously.

Similarly, although optical character recognition (OCR) could be applied to an image or screenshot or picture to extract text-specific information, conventional applications of OCR fail to account for many image data features and/or the context of the image data—that is, other data represented in the image such as the font size(s), font style(s), color(s), other image elements, such as borders, pictures/icons, and so forth, as well as the relative positions between the fonts and/or other images elements or image contextual information. Instead, conventional OCR technologies: (1) are limited to employing OCR for a particular task, such as extracting text; (2) fail to account for non-alphanumeric characters in an image; (3) and do not consider contextual image information for determining intent command (for example, a predicted action requested to be taken from the image).

With this in mind, some aspects of the disclosed subject matter are generally related to extracting useful information from an image (hereinafter referred to as "image data") in order to determine a command and then subsequently to determine tasks—or task entities (that is, particular items of data that go with the task, such as the shopping list items and the store for a shopping list; in this example, the shopping items and the store are the task entities, and a shopping list of items to purchase is a task). Particular types of tasks may have different task entities. In some instances, the task entities can be extracted and/or determined from the image data and image context (e.g., time the image was taken, location, application used, and so forth) using task logic, as described herein.

As used herein, "command" or "intent" may be used interchangeably to refer to content being requested or an action to be completed. The command may be context-specific. Using command logic (such as the command logic 262 of FIG. 2), command may be based on information derivable from alphanumeric characters (e.g., text associated with a natural language processing (NLP) transcription) or non-alphanumeric character objects. In some contexts, commands may refer to the intentions that can be determined from alphanumeric characters or non-alphanumeric character objects. For example, a list of words may include "1 cup of flour," "½ teaspoon of baking soda," "¼ teaspoon of salt," and so forth. Additionally, the image may include a non-alphanumeric-character object, such as a gingerbread man. Based on this list of words and/or the object, a computing system may determine the command to be a recipe or a shopping list. "Task entity" may refer to data specific to the command and that correspond to a task. Taking generation of a shopping list as an example of a command, the shopping list items and the store may be the task entities for a task that is a shopping list. Similarly, taking generation of a recipe as an exemplary command, the largest sized text indicative of the title of the recipe, as well as the smaller text indicative of specific ingredients may correspond to the task entities for a task that is a recipe.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor or processing circuitry executing instructions stored in memory.

Among other components not shown, example operating environment 100 includes a number of user devices, such as user devices 102a and 102b through 102n; a number of data sources, such as data sources 104a and 104b through 104n; server 106; displays 103a and 103b through 103n; and network 110. It should be understood that environment 100 shown in FIG. 1 is an example of one suitable operating environment. Each of the components shown in FIG. 1 may be implemented via any type of computing device, such as computing device 900 described in connection to FIG. 9, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks employing any suitable communication protocol.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities. The displays 103a and 103b through 103n may be integrated into the user devices 102a and 102b through 102n. In one embodiment, the displays 103a and 103b through 103n are touchscreen displays.

User devices 102a and 102b through 102n may comprise any type of computing device capable of use by a user. For example, in one embodiment, user devices 102a through 102n may be the type of computing device 900 described in relation to FIG. 9. By way of example and not limitation, a user device may be embodied as a personal computer (PC), a laptop computer, a mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 4. (For instance, in one embodiment, one or more data sources 104a through 104n provide (or make available for accessing) the task and task entities generated by the command classification and task engine 210 of FIG. 2 and deployed by the task and entity deploying engine 270 of FIG. 2.) Data sources 104a and 104b through 104n may be discrete from user devices 102a and 102b through 102n and server 106. Alternatively, the data sources 104b through 104n may be incorporated and/or integrated into at least one of those components. In one embodiment, one or more of data sources 104a through 104n may be integrated into, associated with, and/or accessible to one or more of the user device(s) 102a, 102b, or 102n or server 106. Examples of computations performed by sever 106 or user devices 102, and/or corresponding data made available by data sources 104a through 104n are described further in connection to system 200 of FIG. 2.

Figure 2:
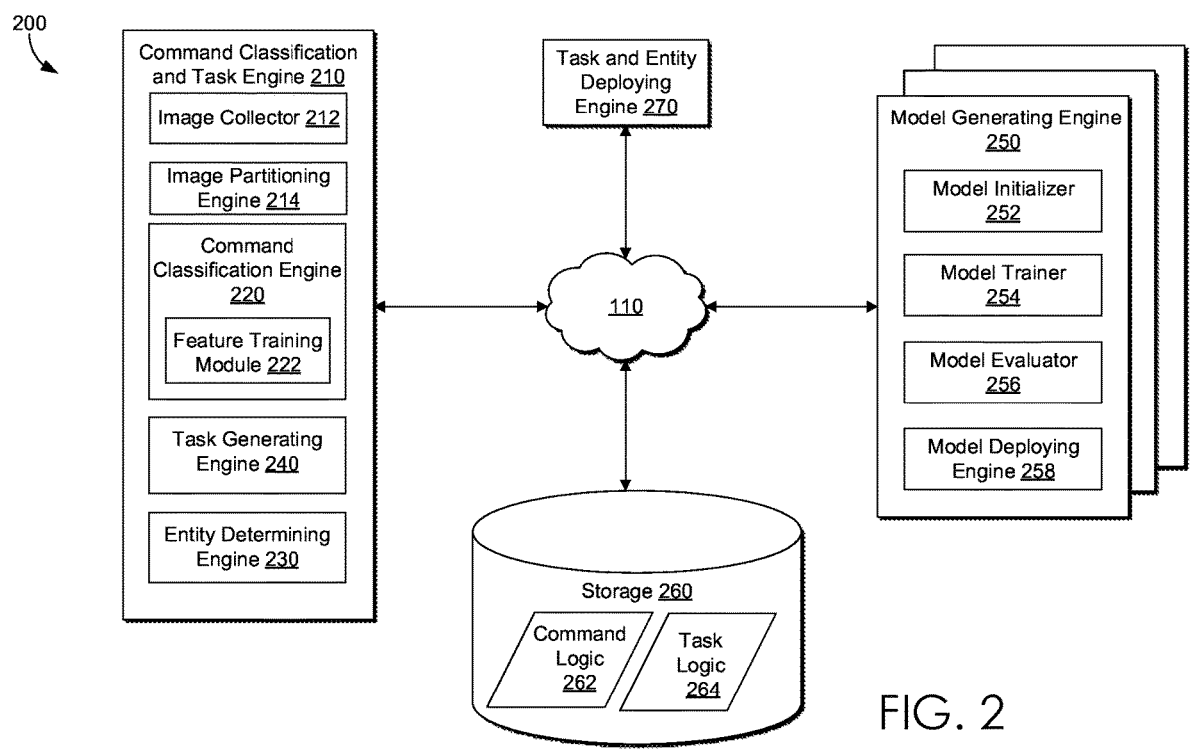
FIG. 2 is a block diagram illustrating an example system in which some embodiments of this disclosure are employed.

Operating environment 100 can be utilized to implement one or more of the components of system 200, described in association with FIG. 2. Operating environment 100 also can be utilized for implementing aspects of process flows 700 and 800 described in FIGS. 7 and 8, respectively. Turning to FIG. 2, depicted is a block diagram illustrating an example system 200 in which some embodiments of this disclosure are employed. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including command classification and task engine 210 (which includes image collector 212, image partitioning engine 214, command classification engine 220, feature training module 222, entity determining engine 230, task generating engine 240), model generating engine 250 (which includes model initializer 252, model trainer 254, model evaluator 256, and model deploying engine 258), and storage 260 (which includes command logic 262 and task logic 264), and task and entity deploying engine 270. The command classification and task engine 210 and the model generating engine 250 may be embodied as a set of compiled computer instructions or functions, program modules, computer software services, or an arrangement of processes carried out on one or more computer systems, such as computing device 900 described in connection to FIG. 9, for example.

In one embodiment, the functions performed by components of system 200 are associated with one or more applications, services, or routines. In one embodiment, certain applications, services, or routines may operate on one or more user devices (such as user device 102*a*), servers (such as server 106), may be distributed across one or more user devices and servers, or may be implemented in a cloud-based system. Moreover, in some embodiments, these components of system 200 may be distributed across a network, including one or more servers (such as server 106) and client devices (such as user device 102*a*), in the cloud, or may reside on a user device (such as user device 102*a*). Moreover, these components and/or functions performed by these components, or services carried out by these components may be implemented at appropriate abstraction layer(s) such as the operating system layer, application layer, hardware layer, and so forth, of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and so forth. Additionally, although functionality is described herein with reference to specific components shown in example system 200, it is contemplated that in some embodiments functionality of these components can be shared or distributed across other components.

Continuing with FIG. 2, the command classification and task engine 210 is generally responsible for determining the command associated with an image and generating a task that includes at least one task entity, as described herein. In this manner, the functionality of productivity tools may be improved and a time a computing device is in operation to generate a task may be reduced by embodiments disclosed herein. The image collector 212 of the command classification and task engine 210 may be configured to receive or access an image, such as a photography, a screenshot, a saved document, and/or any content formatted in any suitable manner. Example image formats include, but are not limited to Joint Photographic Experts Group (JPEG/JFIF), Exchangeable image file format (Exif), Tagged Image File Format (TIFF), Graphics Interchange Format (GIF), BMP file format (Windows bitmap), Portable Network Graphics (PNG), Portable Pixmap (PPM), WebP, BAT, and the like.

In some embodiments, image may be received in response to a user taking a picture (via a camera device of the computing device, in response to the user uploading the image to a software application associated with the command classification engine 220, or any other suitable means for communicating an image to the command classification and task engine 210. For example, a GUI presented to the user may receive a first user input indicative of an option to upload an image and may receive a second user input indicative of a selection of an image to be uploaded. Alternatively or additionally, it should be understood that the image collector 212 may integrate (e.g., via a suitable application peripheral interface (API)) with an photos application, a camera application, and the like of a computing device, such that an image may be directly communicated from the photos application, the camera application, and the like, to the command classification and task engine 210 by way of the image collector 212. In some embodiments, the image collector 212 receives the image as raw data.

The image partitioning engine 214 is configured to divide the image into computer-recognizable components. In some embodiments, the image partitioning engine 214 is configured to determine alphanumeric characters and non-alphanumeric-character objects. The image partitioning engine 214 may determine each alphanumeric character (such as each letter, symbol, character, and the like), or may determine a sequence of alphanumeric characters as a phrase or word. The image partitioning engine 214 may determine a non-alphanumeric-character object, such as a person, item, and its corresponding content. For example, the image partitioning engine 214 may determine a person in the image, and may determine the face of the person, the body of the person, a color of the clothes worn by the person, and so forth. In one embodiment, the image partitioning engine 214 is able to assign genus-species relationships between the alphanumeric characters and their subcomponents and the non-alphanumeric-character objects and their subcomponents. For example, the image partitioning engine 214 may determine a sequence of alphanumeric characters (e.g., a genus) and each individual character in the sequence (e.g., the species of the genus), and related the alphanumeric characters to its respective individual characters via a genus-species relationship.

Furthermore, the image partitioning engine 214 may determine a position of the alphanumeric characters and the non-alphanumeric-character objects. In some embodiments, the image partitioning engine 214 may determine coordinates of the alphanumeric characters and the non-alphanumeric-character objects relative to the entire image, relative to each other, and the like. In one embodiment, the image partitioning engine 214 may divide the image into any number of partitions. For example, the image partitioning engine 214 may divide the image into a grid (for example, a 100 by 100 grid having 10,000 grid elements) having uniform or un-uniform grid elements. The image partitioning engine 214 may assign x-coordinates (for example, horizontal coordinates) and y-coordinates (for example, vertical coordinates). In one embodiment, the x-coordinates and the y-coordinates may be perpendicular to each other. Coordinates of each of the alphanumeric characters and non-alphanumeric-character objects may be determined based on the grid and/or the x and y coordinates.

In one embodiment, the image partitioning engine 214 is configured to generate B-Box Embeddings of the alphanumeric characters and the non-alphanumeric-character objects identified in the image. Generating the B-Box Embedding may cause determining a height, mean elevation, elevation, distance from an edge of the image, and/or other properties for the alphanumeric character and the non-alphanumeric-character object in the image to generate a respective position or position profile for the alphanumeric character and the non-alphanumeric-character object. The position profile may include a set of coordinates associated with the alphanumeric character and the non-alphanumeric-character object. The set of coordinates may be relative to the entire image or relative to the set of coordinates of other alphanumeric characters and/or other non-alphanumeric-character object. In this manner, the alphanumeric characters and the non-alphanumeric-character objects identified in the image may better be related to each other, as well as to the entire image to better determine the image data. Indeed, a computing system may be better able to determine image data based on a relationship between the position profile of the alphanumeric characters and of the non-alphanumeric-character objects.

The image partitioning engine 214 may determine and generate image data. In some embodiments, the image partitioning engine 214 may determine and/or generate the image data based on the partitions of the image and/or based on the position profile of the alphanumeric characters and of the non-alphanumeric-character objects. For example, the image partitioning engine 214 may process the raw image data and generate image data as discussed below with respect to FIG. 2. The image data may include machine-encoded text information, position information, color information, and so forth, corresponding to the image and its corresponding alphanumeric characters and/or non-alphanumeric character objects. The image partitioning engine 214 may extract image data for the image based on the alphanumeric characters and the non-alphanumeric-character objects. Extracting image data may include determining the partitioned elements in the image (e.g., the alphanumeric characters and the non-alphanumeric-character objects) and a position profile for the alphanumeric characters and the non-alphanumeric-character objects. As discussed below with respect to the model generating engine 250, herein, the image data may be processed by the model generating engine to train and generate a machine learning model.

Continuing with FIG. 2, the command classification engine 220 is configured with computing logic, such as the command logic 262, to determine the command of the image. The command classification engine 220 may determine the command based on the command logic 262. In some embodiments, the command classification engine 220 determines a command of the image based on the image data. For example, the command classification engine 220 may employ OCR methodologies to determine a context and meaning of text (e.g., alphanumeric characters) identified in the image. In some embodiments, the command classification engine 220 may employ a machine learning model that is trained and generated by the model generating engine 250. The command logic 262 may define logic for using OCR. Example machine learning models include a neural network model, a logistic regression model, a support vector machine model, and the like.

The command classification engine 220 may determine the command based on a machine learning model that is trained based on a set of image data features. The feature training module 222 may be configured with computing logic, such as the command logic 262, to determine and generate image data features that may be used to train the machine learning model. In one embodiment, the feature training module 222 may determine the image data features used to train the machine learning model via any suitable process. For example, the feature training module 222 may determine the image data features via any suitable engineering process, which may include at least one of the following steps: brainstorming or testing features, deciding which features to create, creating the features, testing the impact of the created features on a task or training data, and iteratively improving features. Image data features may be engineered by the feature training module 222 using any suitable computations, including, but not limited to, (1) numerical transformation (e.g., taking fractions or scaling), (2) employing a category encoder to categorize data, (3) clustering techniques, (4) group aggregation values, (5) principal component analysis, and the like. In some embodiments, the feature training module 222 may assign different levels of significance to the image data, such that certain image data features that have a higher level of significant are weighted when the model trainer 254 trains the machine learning model. In this manner, the model trainer 254 may prioritize and/or rank image data features to improve command determination.

The command classification engine 220 may employ any suitable classification or prediction algorithm to classify and/or predict the command of an image, for example, based on the image data features. The command classification engine 220 may classify the command as a user request to generate content based on the image. Example content may include a calendar event, a recipe, a shopping list, a reminder, a message (for example, email, text message, social media post, and the like). Therefore, the command classification engine 220 may determine that a user wishes to generate a calendar event, a recipe, a shopping list, a reminder, a message (for example, email, text message, social media post, and the like), and so forth based on the image. It should be understood that the embodiments disclosed herein may be broadly applied to predict any suitable intent or computer command other than those described in this paragraph.

The task generating engine 240 may determine at least one task that corresponds to the command determined by the command classification engine 220. In some embodiments, the task generating engine 240 employs task logic 264 to determine the task. The task logic 264 may define intent-specific instructions for determining the task. The intent-specific instructions may include a subset of the entire task logic 264, thereby improving the speed by which the task generating engine 240 is able to generate the task. For example, in response to the command classification engine 220 classifying the command as generating content associated with food, the task generating engine 240 may employ task logic 264 associated with food. In this example, the task logic 264 associated with food may indicate a recipe or a shopping list. Based on the image data features, the task generating engine may determine that the task associated with this command corresponds to a shopping list.

Continuing with FIG. 2, the entity determining engine 230 may determine task entities associated with the task generated by the task generating engine 240. In some embodiments, the entity determining engine 230 may employ the task logic 264 to determine task entities that are specific to a particular task. Continuing the example above, the entity determining engine 230 may determine the ingredients and title (of the recipe) based on the task. For example, the image data may include certain alphanumeric characters in close proximity to each other (based on the corresponding position profile) indicative of food and corresponding units (and numbers) of measurement. The entity determining engine 230 may communicate these task entities to the task generating engine 240 so that the task (e.g., the recipe) is generated with the task entities (e.g., the ingredients, their units of measurements, and the title). The task entities may have been included as alphanumeric characters or non-alphanumeric-character objects in the image. Example tasks and task entities are depicted on and described below with respect to FIGS. 4, 5, and 6.

Although FIG. 2 was discussed in the context of determining one command, one corresponding task, and a few task entities, it should be understood that any number of commands, corresponding tasks, and task entities may be determined/generated. For example, two task commands may be determined, such that a user (e.g., via the user device 102a of FIG. 1) may make a selection indicative of which command of the two commands to generate a corresponding task and task entities. Similarly, a user may select both commands such that both tasks and corresponding entities are generated based on the embodiments disclosed herein.

The task and entity deploying engine 270 may be configured with computing logic to configure the generated task and entities for use in any suitable abstraction layer, for example of the user device 102a. In some embodiments, the task and entity deploying engine 270 may receive the task from the task generating engine 240 and the task entity from the entity determining engine 230. Based on the command of the task, the task, or the task entity, the task and entity deploying engine 270 may deploy the task and the task entity to an associated software application, such as any suitable computer productivity application. For example, in response to determining the command to correspond to generating a shopping list, the task and entity deploying engine 270 may format and deploy the task and task entity to a reminder software application or a to-do productivity software application. In some embodiments, the task and entity deploying engine 270 may communicate with any software application via any suitable API or other communication means. Although this example includes the task and entity deploying engine 270 formatting, configuring, and communicating the task and task entity for use in a software application of an application layer, it should be understood that the task and entity deploying engine 270 may format, configure, and communicate the task to any suitable abstract layer, such as an operating system layer, another application layer, or a hardware layer.

Continuing with FIG. 2, the model generating engine 250 may train and generate a machine learning model that may be employed by the command classification and task engine 210. The model initializer 252 may select and initialize a machine learning model. As discussed above, example machine learning models include a neural network model, a logistic regression model, a support vector machine model, and the like. Initializing the machine learning model may include causing the model initializer 252 to determine model parameters and provide initial conditions for the model parameters. In one embodiment, the initial conditions for the model parameters may include a coefficient for the model parameter.

The model trainer 254 may train the machine learning model determined by the model initializer 252. As part of training the machine learning model, the model trainer 254 may receive outputs from the model initializer 252 to train the machine learning model. In some embodiments, the model trainer may receive the type of machine learning model, the loss function associated with the machine learning model, the parameters used to train the machine learning model, and the initial conditions for the model parameters. Example loss functions include a standard cross entropy loss function, a focal loss function, a dice loss function, and a self-adjusting loss function, to name a few. The model trainer 254 may iteratively train the machine learning model. In one embodiment, training the machine learning model may include employing an optimizer that causes the machine learning model to continue to be trained using the training data is until certain conditions are met, for example, as determined by the model evaluator 256. Alternatively, the model trainer 254 may feed one set of training data to the machine learning model to generate a predicted output that is used by the model evaluator 256.

Example training data includes any labeled data or unlabeled data. For example, training data may include computing device information (such as charging data, date/time, or other information derived from a computing device), user-activity information (for example: app usage; online activity; searches; browsing certain types of webpages; listening to music; taking pictures; voice data such as automatic speech recognition; activity logs; communications data including calls, texts, instant messages, and emails; website posts; other user data associated with communication events; other user interactions with a user device, and so forth) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com or eBay account), other data that may be sensed or otherwise detected, data derived based on other data (for example, location data that can be derived from Wi-Fi, cellular network, or IP (internet protocol) address data), calendar items specified in user's electronic calendar, and nearly any other data that may be used to train a machine learning model, as described herein.

The model evaluator 256 may evaluate the accuracy of the machine learning model trained by the model trainer 254. In some embodiments, the model evaluator 256 is configured to assess the accuracy of the model based on a loss (e.g., error) determined based on the loss function. The model evaluator 256 may validate the machine learning model. In some embodiments, the model evaluator 256 may validate the machine learning model based on training data used for validation purposes instead of training purposes. In some embodiments, the training data used by the model evaluator 256 to validate the machine learning model may correspond to training data different from the training data used by the model trainer 254 to train the machine learning model. In some embodiments, the training data received via the model generating engine 250 may be split into training data used by the model trainer 254 and training data used by the model evaluator 256. In one embodiment, the training data used by the model evaluator 256 may be unlabeled, while the training data used by the model trainer 254 may be labeled.

The model evaluator 256 may validate the machine learning model based on a score function. The score function may facilitate determining probabilistic scores for a classification machine learning model or estimated averages for regression problems, to name a couple examples. It should be understood that the score function may include any suitable algorithm applied to training data to uncover probabilistic insights indicative of the accuracy of the machine learning model. In some embodiments, the model evaluator 256 may employ a score function to determine whether the machine learning model is at or above a validation threshold value indicative of an acceptable model validation metric. The model validation metric may include a percent accuracy or fit associated with applying the machine learning model trained by the model trainer 254 to the training data. If the model evaluator 256 determines that the machine learning model fails to meet the model validation metric, then the model trainer 254 may continue to train the machine learning model. On the other hand, if the model evaluator 256 determines that the machine learning model passes validation, the model deploying engine 258 may deploy the machine learning model, for example, to the user device 102.

In some embodiments, the model deploying engine 258 may receive a machine learning model determined to be sufficiently trained. The model deploying engine 258 may deploy a trained machine learning model to the command classification and task engine 210. As discussed herein, the command classification and task engine 210 may use the trained machine learning model deployed via the model deploying engine 258 to perform the functionality described herein.

The task and entity deploying engine 270 may deploy the command classification and task engine 210, its outputs, and/or the machine learning model generated by the model generating engine 250 to any suitable computing device (e.g., the client device 102a), via any suitable abstraction layer. For example, the task and entity deploying engine 270 may transmit the command classification and task engine 210, its outputs, and/or the machine learning model to the operating system layer, application layer, hardware layer, and so forth, associated with a client device or client account. In one embodiment, the command classification and task engine 210, the model generating engine 250, or any of its components may integrate with an existing software application, such as a computer productivity application. For example, the command classification and task engine 210, the model generating engine 250, or any of its components may be installed as a plug-in (for example, a plug-in extension) to a web-based application or browser or the computer productivity application.

In the context of the task and entity deploying engine 270 transmitting to a computing device the command classification and task engine 210, its outputs, and/or the machine learning model to the operating system layer (e.g., of a client device), the task and task entities may easily be accessible to the computing device. A user may select an image or snap a picture of an image to which the embodiments described herein will be applied. For example, the user may select an image or snap a picture of an image for which the command, task, and task entity may be determined and generated, as discussed herein. In this manner, a computing device may include out-of-the-box software that classifies or predicts a command, as well as determines and generates tasks and task entities, as discussed herein. Alternatively, the computing device may access the functionality described herein as any suitable software-as-a-service (SaaS) service or by any other means.

In one embodiment, the task and entity deploying engine 270 may be generally responsible for presenting content and related information, such as the task and task entities illustrated in FIGS. 4, 5, and 6, to a user. The task and entity deploying engine 270 may comprise one or more applications or services on a user device, across multiple user devices, or in the cloud. For example, in one embodiment, presentation component 916 manages the presentation of content to a user across multiple user devices associated with that user. In some embodiments, presentation component 916 may determine a format in which content is to be presented. In some embodiments, presentation component 916 generates user interface elements, as described herein. Such user interface elements can include queries, prompts, graphic buttons, sliders, menus, audio prompts, alerts, alarms, vibrations, pop-up windows, notification-bar or status-bar items, in-app notifications, or other similar features for interfacing with a user.

Figure 3:
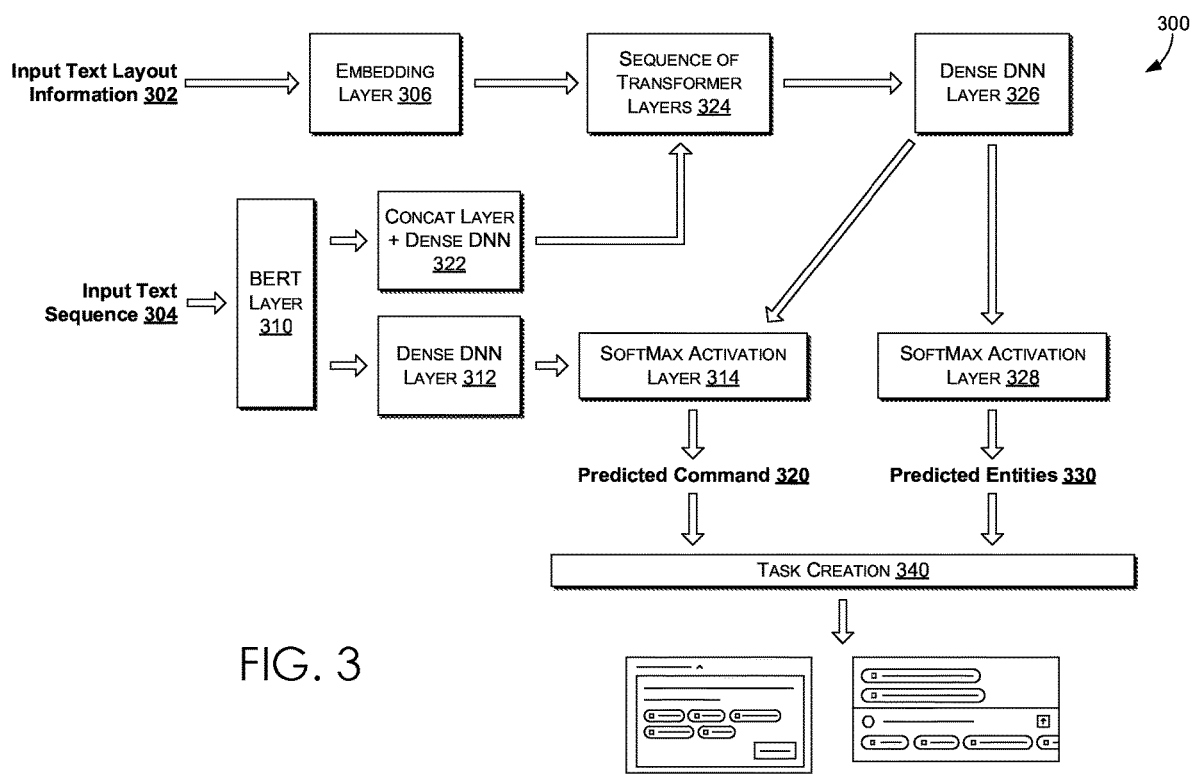
FIG. 3 is a flow diagram of an example process for determining and generating a task and task entities based on a command, according to some embodiments of this disclosure.

Turning to FIG. 3, depicted is a flow diagram of an example process 300 for determining and generating a task and task entities based on the command, according to some embodiments of this disclosure. The process 300 may be performed via any component of the environment 100 of FIG. 1 and/or the system 200 of FIG. 2 by any suitable component, such as the command classification and task engine 210, for example. As illustrated, process 300 includes performing analysis on an image (for example, received via the image collector 212 of FIG. 2) and detecting available alphanumeric characters and corresponding position profiles. Additionally, position profiles of the non-alphanumeric-character objects may be determined (for example, via the image partitioning engine 214 of FIG. 2).

At a high level, based on the analysis performed on the image, the process 300 includes receiving input text layout information 302 and receiving an input text sequence 304. The input text sequence 304 may be input into a BERT Base Language Model 310 to generate (1) a pooled output and (2) a sequence output. The input text layout information 302 and the input text sequence 304 may correspond to the alphanumeric characters or the non-alphanumeric-character objects. First, the pooled output may be communicated to a first machine learning model 312, such as a deep neural network (DNN) machine learning model, and may be communicated to a first SoftMax Activation Layer 314. The probabilities output from the first SoftMax Activation Layer 314 may be used to extract and determine the predicted command 320. Second, the sequence output may be input into a Concatenated Layer 322. The Concatenated Layer 322 may receive the sequence output and generate an output communicated to a Sequence of Transformer layer 324. The output of the Sequence of Transformer Layer 324 may be input to the second machine learning layer 326, and the output of the second machine learning layer 326 may be input into the first SoftMax Activation Layer 314 and a second SoftMax Activation Layer 328. The second SoftMax Activation Layer 328 may be used to extract and determine the predicted task entities 330. The task 340 and associated task entities may be generated, for example, for use in a computer productivity application, as discussed herein. Although the embodiment of FIG. 3 is discussed in the context of a BERT Base Language Model, any suitable model may be employed. For example, a machine learning model trained via the model generating engine 250 may be used.

In more detail, process 300 may include obtaining a position profile for each alphanumeric character and non-alphanumeric character object. In one embodiment, an Embedding layer 306 and the Concatenated Layer 322 may obtain B-Box Embeddings. The B-Box Embeddings may be concatenated with the sequence output of the Bert Layer 310 to obtain the embeddings used to determine the predicted task entities 330. In one embodiment, the B-Box Embeddings may be obtained using a LayoutLM architecture. The B-Box Embeddings may be obtained by splitting an image into an x-y coordinate space of N by M grids, where N and M correspond to any real number. For example, the coordinate space may be split up into a 100 by 100 grid. The size of each grid may be of any size and may be uniform or un-uniform. Each set of B-Box corner (e.g., left top and bottom right) may include coordinates, such as x0, x1, y0, y1. The coordinates may be related to any portion of the image, such as a floor. Using these coordinates as an example, a height may be calculated as y0–y1, a mean elevation may be calculated as (y0+y1)/2, and elevation may be calculated as y0, and the distance from the left edge of the image may be x0. Although this example is discussed in the context of B-Box Embeddings, the Embedding Layer 306 and/or Concatenated Layer 322 may obtain any measurements to facilitate determination of the position profile for the alphanumeric characters and non-alphanumeric-character objects. In this example, the B-Box Embeddings are indicative of the position profile for each of the alphanumeric characters and non-alphanumeric-character objects.

In some embodiments, the sequence of transformer layer 324 may normalize the B-Box embedding of the alphanumeric characters and non-alphanumeric-character objects. Instead of each of the alphanumeric characters and non-alphanumeric-character objects being processed individually, the sequence of transformer layer 324 relates the position profile of the alphanumeric characters and non-alphanumeric-character objects. Alternatively or additionally, the sequence of transformer layer 324 may relate the position profile of one alphanumeric character (or of one non-alphanumeric-character object) to the image as a whole. In this manner, computations can be improved and CPU cycles reduced since the position profile only relates each of the alphanumeric characters and non-alphanumeric-character objects to the image as a whole instead of to each other.

The machine learning model layer 312 and/or the second machine learning layer 326 may receive the outputs from the BERT layer 310 and the sequence of transformer layer 324 to relate the position profiles of the alphanumeric characters and non-alphanumeric-character objects to each other. For example, the first machine learning model layer 312 and/or the second machine learning model layer 326 may determine classification (CLS) metrics representing sentence-level classifications of associated alphanumeric-characters and may determine SEP metrics indicating the formation of a new sentence or association of alphanumeric-characters. By relating alphanumeric characters phrases, words, or other groups of the alphanumeric characters may be generated.

To better relate these groups of alphanumeric characters to other groups of alphanumeric characters, other non-alphanumeric-character objects, or another alphanumeric character, a conditional random fields (CRF) layer may be employed by the process 300. CRF refers to a statistical pattern recognition modeling method which predicts a label for a sample by considering "neighboring samples." In this manner, a context of the image may be determined. The context of the image may include a relationship between the content detected in the image, such as the alphanumeric characters and non-alphanumeric-character objects.

Figure 4A:
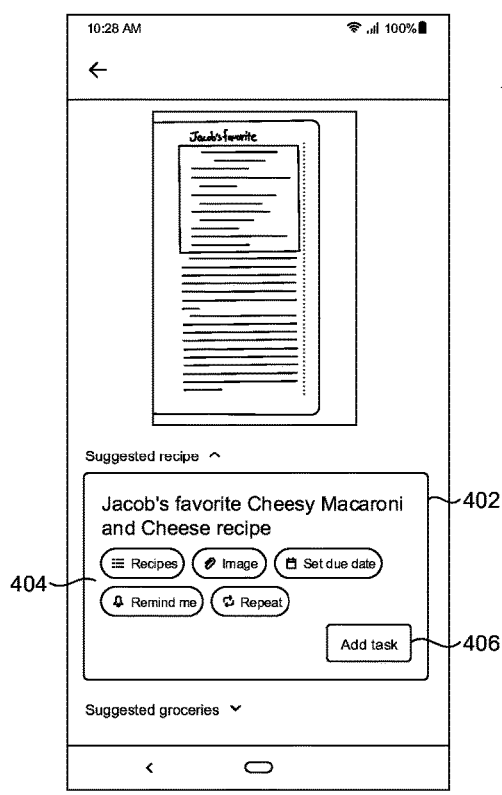
FIG. 4A is a screenshot of an example graphical user interface (GUI) designed to receive an image used to generate a command, a task, and a task entity, according to some embodiments of this disclosure.
Figure 4B:
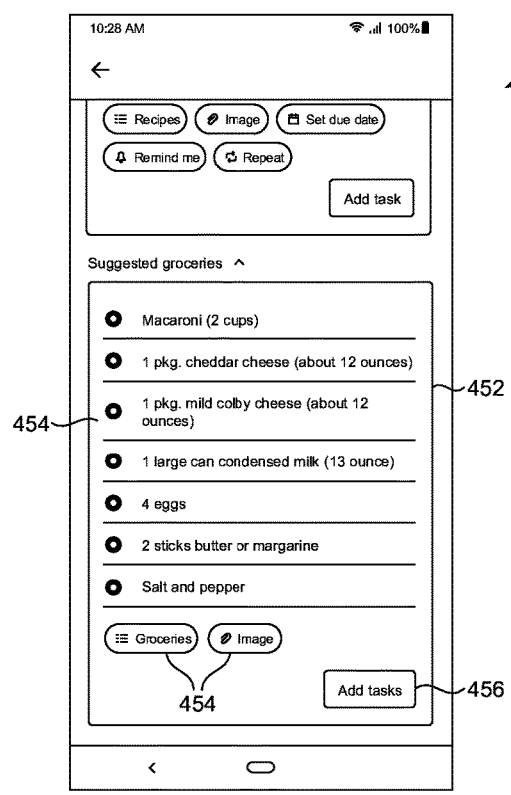
FIG. 4B is a screenshot of an example GUI designed to receive an image used to generate a command, a task, and a task entity, according to some embodiments of this disclosure.

FIGS. 4A and 4B depict a screenshot of example graphical user interfaces (GUI) 400 and 450 designed to receive an image used to generate a command, a task, and a task entity, according to some embodiments of this disclosure. As illustrated, the image received (for example, received via the image collector 212 of FIG. 2) may correspond to a recipe with a listing of ingredients. As shown in the GUI 400, the command classification and task engine 210 (of FIG. 2) may employ the command classification engine 220 to determine that the command includes generating a recipe. As illustrated, a task 402 (for example, generated via the task generating engine 240 of FIG. 2) may correspond to a recipe and may include any suitable task entities 404 (in this example, "recipe" and "Image"). Additional task entities (for example, generated via the entity determining engine 230 of FIG. 2) for the recipe may include steps for cooking the recipe, temperatures for cooking the recipe and so forth. By selecting the "add task" selectable GUI element 406, the generated task may be integrated into a suitable computer productivity application (for example, by the task and entity deploying engine 270 of FIG. 2), as disclosed herein.

Turning to GUI 450, more than one command may be determined. For example, GUI 450 may correspond to GUI 400, such that a user may scroll down on GUI 400 to arrive at the GUI 450. Whereas the command associated with GUI 400 included generating a recipe, the command classification and task engine 210 may determine that a second command includes generating a shopping list. As illustrated, a task 452 (for example, generated via the task generating engine 240) may correspond to a recipe and may include any suitable task entities 454 (in this example, "recipe" and "Image" and the individual shopping items). Additional task entities (for example, generated via the entity determining engine 230) for the shopping list may include a store selling the items, the items' availability, and so forth. By selecting the "add task" selectable GUI element 456, the generated task may be integrated into a suitable computer productivity application (for example, by the task and entity deploying engine 270 of FIG. 2), as disclosed herein.

Turning to FIGS. 5A and 5B, depicted are screenshots of example graphical user interfaces (GUI) 500 and 550 designed to receive an image used to generate a command, a task, and a task entity, according to some embodiments of this disclosure. As illustrated, the image received (for example, received via the image collector 212 of FIG. 2) may correspond to an image advertising an event occurring at a specific time. As shown in the GUI 500, the command classification and task engine 210 (of FIG. 2) may employ the command classification engine 220 to determine that the command includes generating an event reminder. As illustrated, a task 502 (for example, generated via the task generating engine 240 of FIG. 2) may correspond to an event integratable with a calendar software application and may include any suitable task entities 504 (in this example, "tasks," "Image," "due Fri, January 29," "remind me at 14:00 Tue January 26"). Additional task entities (for example, generated using the entity determining engine 230 of FIG. 2) for the event may include a listing of speakers, a URL associated with the event, and so forth. By selecting the "add task" selectable GUI element 456, the generated task may be integrated into a suitable computer productivity application (for example, by the task and entity deploying engine 270 of FIG. 2), as disclosed herein.

Turning to GUI 550 of FIG. 5B, the generated task of FIG. 5A may integrate with a calendar software application. For example, the task and entity deploying engine 270 may communicate the task and associated task entities to the calendar software application. As discussed above with respect to FIG. 5A, the task entities, namely, the "tasks," "Image," "due Fri, January 29," "remind me at 14:00 Tue January 26," and the title of the event, may be communicated to the calendar software application. As illustrated, the task and the task entities may be assigned to corresponding regions in the GUI 550. In this example, the task entities of the GUI 500 of FIG. 5A may be communicated to corresponding fields in the GUI 550. In one embodiment, the communication may be realized via APIs. The GUI 550 may correspond to a GUI of the calendar software application or a reminder software application.

Figure 6A:
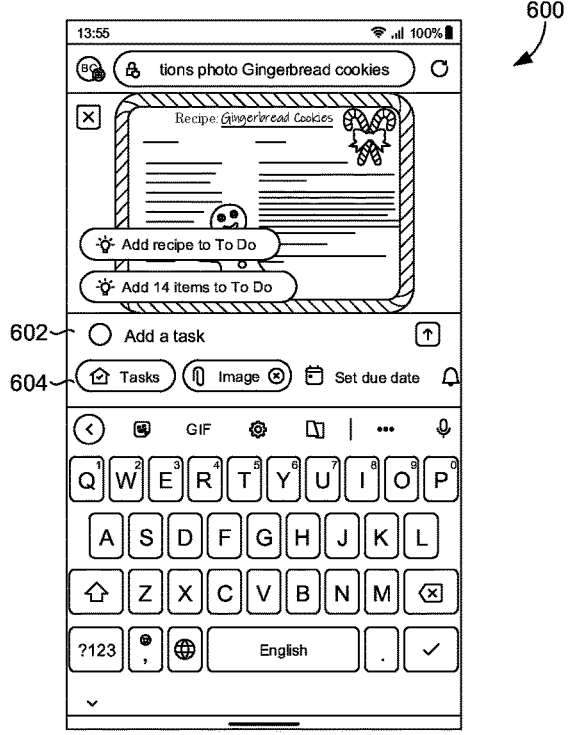
FIG. 6A is a screenshot of an example GUI designed to receive an image used to generate a command, a task, and a task entity, according to some embodiments of this disclosure.
Figure 6B:
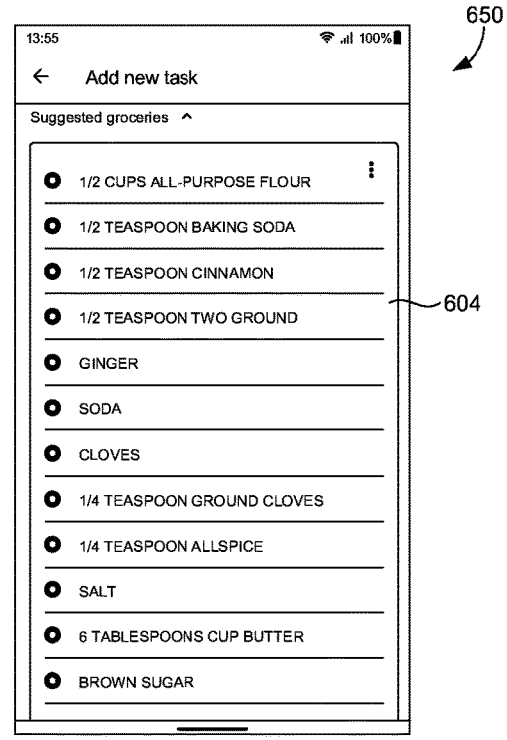
FIG. 6B is a screenshot of an example GUI designed to receive an image used to generate a command, a task, and a task entity, according to some embodiments of this disclosure.

FIGS. 6A and 6B depict a screenshot of example graphical user interfaces (GUI) 600 and 650 designed to receive an image used to generate a command, a task, and a task entity, according to some embodiments of this disclosure. As illustrated, the image received (for example, received via the image collector 212 of FIG. 2) may correspond to a recipe with a listing of ingredients. As illustrated, in this example, the image includes alphanumeric characters, such as ingredients and non-alphanumeric-character objects, such as the gingerbread man. As shown in the GUI 600, the command classification and task engine 210 (of FIG. 2) may employ the command classification engine 220 to determine that the command includes a shopping list of groceries. As illustrated, a task 602 (for example, generated via the task generating engine 240 of FIG. 2) may correspond to a shopping list and may include any suitable task entities 604 (in this example, "tasks" and "Image"). Turning to GUI 650 of FIG. 6B, GUI 650 may correspond to GUI 600, such that a user may scroll down on GUI 600 to arrive at the GUI 650. As illustrated in GUI 650, task entities for the shopping list may include the ingredients and/or shopping items depicted in FIG. 6B.

Figure 7:
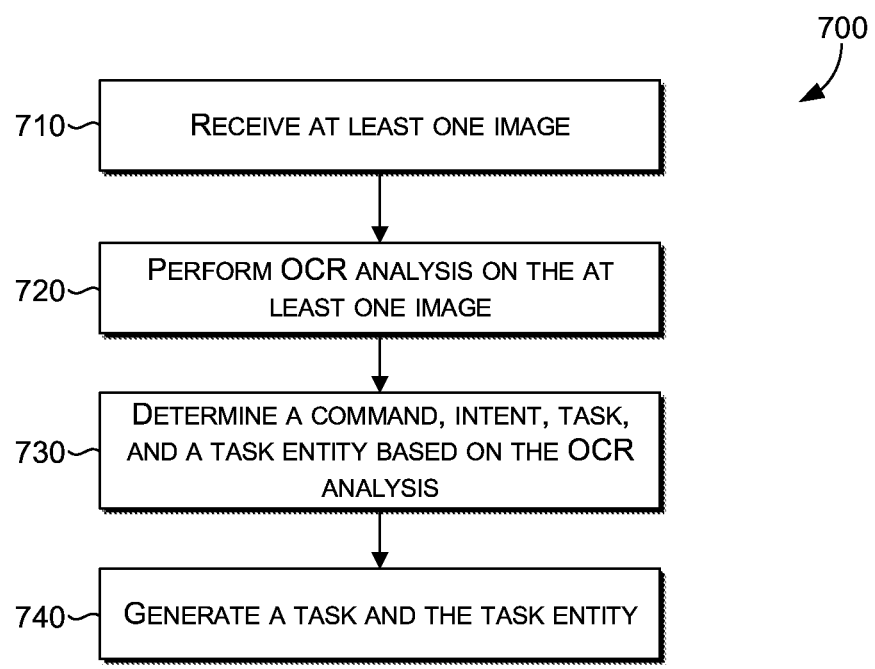
FIG. 7 is a flow diagram of an example process for generating a task and a task entity, according to some embodiments of this disclosure.

Turning now to FIG. 7, depicted is a process 700 for generating a task and a task entity, in accordance with embodiments of this disclosure. Indeed, process 700 (and process 800 of FIG. 8) and/or any of the functionality described herein may be performed by processing logic that comprises hardware (e.g., circuitry, dedicated logic, programmable logic, microcode), software (e.g., instructions run on a processor to perform hardware simulation), firmware, or a combination thereof. Although particular blocks described in this disclosure are referenced in a particular order or a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the process 600 (or process 700) or any other functionality described herein.

Per block 710, particular embodiments include receiving one or more images. Per block 720, particular embodiments include performing OCR analysis on the one or more images. Per block 730, particular embodiments include determining a command, task, and a task entity based on the OCR analysis. Per block 740, particular embodiments include generating a task and the task entity.

Figure 8:
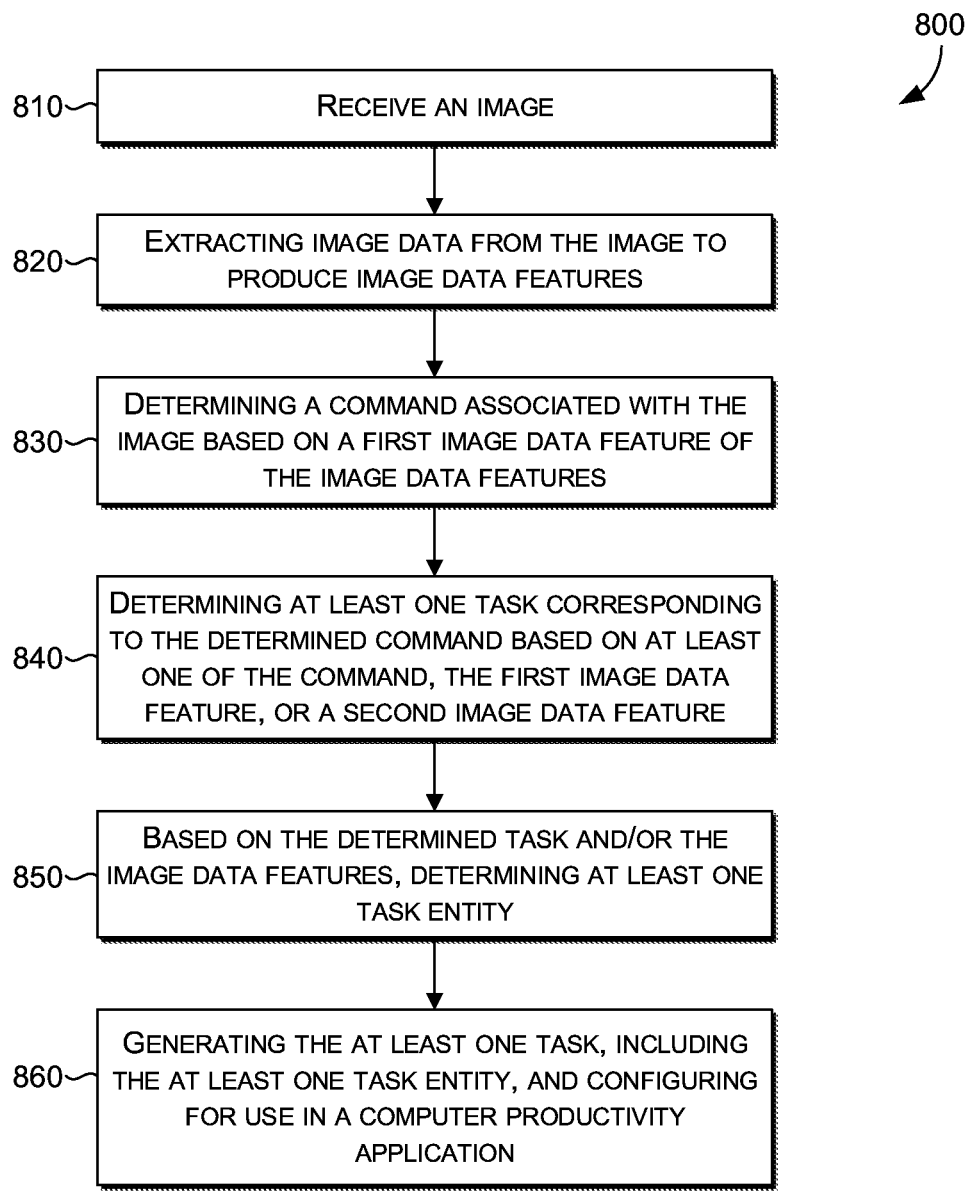
FIG. 8 is a flow diagram of an example process for generating a task, including a task entity, for use in a computer productivity application, according to some embodiments of this disclosure.

Turning to FIG. 8, depicted is a flow diagram of an example process 800 for generating a task, including a task entity, for use in a computer productivity application, according to some embodiments of this disclosure. Embodiments of example process 800 may be carried out using a computer system having components described in connection with example system 200 (FIG. 2). In particular, additional details of the various blocks and operations performed in process 800 are described in connection with FIG. 2 and example system 200. In addition or alternatively, embodiments of the blocks described in process 800, and in particular blocks 830, 840, and 850 for determining a command, task, and task entity respectively, may be performed as described in connection with FIG. 3.

Accordingly, per block 810, particular embodiments include receiving an image comprising alphanumeric characters and non-alphanumeric-character objects. Per block 820, particular embodiments include extracting image data for the image based on the alphanumeric characters and the non-alphanumeric-character objects to produce a set of image data features. Per block 830, particular embodiments include determining a command associated with the image based on at least a portion of the set of image data features. Per block 840, particular embodiments include determining at least one task corresponding to the determined command, based on the determined command, a portion of the set of image data features, or a context associated with the image. Per block 850, particular embodiments include, based on the determined task and the set of image data features, determining at least one task entity. Per block 860, particular embodiments include generating a task that includes the at least one task entity and that is configured for use in a computer productivity application.

Technical Improvement and Literal Support for Claims

Methods, systems, and computer storage media for more efficiently determining a computer command based on image data to generate a task, as discussed herein. In some embodiments, a computerized system is provided. The computerized system includes at least one computer processor and computer memory storing computer-useable instructions that, when used by the at least one computer processor, cause the at least one computer processor to perform operations. The operations include receiving a digital image comprising at least an indication of non-alphanumeric-character objects; extracting image data for the image based on at least the non-alphanumeric-character objects to produce a plurality of image data features; determining a command associated with the image based on at least a first image data feature in the plurality of image data features; determining at least one task corresponding to the determined command based on at least one of the command, the first image data feature, or a second image data feature; based on the determined at least one task and the plurality of image data features, determining at least one task entity; and generating the at least one task. The task includes the at least one task entity and configured for use in a computer productivity application. Advantageously, these and other embodiments, as described herein, provide improved technologies to computer systems for providing assistance or productivity services by, among other aspects, enabling a computer system to infer a command from an image and determine or generate a task corresponding to the command for use by a computer productivity application or service. In this way, embodiments provide new, enhanced functionality for these computer productivity applications or services and also reduce computational resources that would be required from manual operation or creation of these tasks, and/or manually specifying task entities. Whereas existing approaches are unable to infer a command from an image, and at best are merely able to perform a targeted analysis for one purpose, the disclosed subject matter provides an improved technique for generating tasks and task entities based on a command predicted or determined from an image, allowing for analysis for a plurality of purposes (e.g., commands and intents). In this manner, generation of a task is improved and automated based on the command associated with the image, thereby reducing the time a computing device remains in operation to process manual user inputs.

In any combination of the above embodiments, the command is determined based on a machine learning model that is trained using a plurality of images comprising alphanumeric characters and non-alphanumeric-character objects.

In any combination of the above embodiments, the digital image further includes an indication of alphanumeric characters, and wherein the plurality of image data features include visual features associated with text corresponding to the alphanumeric characters and spatial features associated with coordinates associated with and relating the alphanumeric characters and the non-alphanumeric-character objects.

In any combination of the above embodiments, the digital image further includes an indication of alphanumeric characters, and the operations further comprising determining a corresponding coordinate set for each alphanumeric character and for each non-alphanumeric-character object, wherein the command is determined based on at least one image data feature indicative of a comparison of each corresponding coordinate set to one another.

In any combination of the above embodiments, the operations further include communicating the at least one task to an application layer of a computing device, wherein communicating the at least one task to the application layer includes integrating the at least one task or the at least one task entity into a software application.

In any combination of the above embodiments, the command includes a calendar event, the at least one task entity includes a calendar event description, the at least one task includes creating a calendar event integratable with a calendar software application, and communicating the at least one task to the application layer includes adding the calendar event to an electronic calendar associated with the calendar software application.

In any combination of the above embodiments, the operations include determining a second command of the image based on extracted text and extracted coordinates being applied to a machine learning model; determining a second task based on at least one of the second command; determining a second task entity associated with the second task based on the extracted text, the extracted coordinates, or both; and generating the second task, comprising the second task entity.

In any combination of the above embodiments, determining the command of the image includes determining that the image includes at least one of: a recipe, a scheduled event, a list of items.

In any combination of the above embodiments, the digital image includes a digital video or computer animation, and wherein the plurality of image data features include time-sensitive spatial image features and visual image features.

In any combination of the above embodiments, the operations further include determining an image context based on at least one data feature of the plurality of image data features, and wherein the at least one task is further determined based on the image context.

In some embodiments at least one computer-storage media is provided. The at least one computer-storage media includes computer-executable instructions embodied thereon that, when executed by a computing system having a processor and memory, cause the processor to perform operations. The operations include receiving an image comprising alphanumeric characters and non-alphanumeric-character objects; extracting image data for the image based on the alphanumeric characters and the non-alphanumeric-character objects to produce a plurality of image data features; determining a command associated with the image based on at least a first image data feature in the plurality of image data features; and determining at least one task corresponding to the determined command based on at least one of the command, the first image data feature, or a second image data feature. The operations also include, based on the determined at least one task and the plurality of image data features, determining at least one task entity; and generating the at least one task, comprising the at least one task entity and configured for use in a computer productivity application. Advantageously, these and other embodiments, as described herein, provide improved technologies to computer systems for providing assistance or productivity services by, among other aspects, enabling a computer system to infer a command from an image and determine or generate a task corresponding to the command for use by a computer productivity application or service. In this way, embodiments provide new, enhanced functionality for these computer productivity applications or services and also reduce computational resources that would be required from manual operation or creation of these tasks, and/or manually specifying task entities. Whereas existing approaches are unable to infer a command from an image, and at best are merely able to perform a targeted analysis for one purpose, the disclosed subject matter provides an improved technique for generating tasks and task entities based on a command predicted or determined from an image, allowing for analysis for a plurality of purposes (e.g., commands and intents). In this manner, generation of a task is improved and automated based on the command associated with the image, thereby reducing the time a computing device remains in operation to process manual user inputs.

In any combination of the above embodiments, the plurality of image data features include visual features associated with text corresponding to the alphanumeric characters and spatial features associated with coordinates associated with and relating the alphanumeric characters and the non-alphanumeric-character objects.

In any combination of the above embodiments, the instructions further cause the processor to determine a corresponding coordinate set for each alphanumeric character and for each non-alphanumeric-character object, wherein the command is determined based on at least one image data feature indicative of a comparison of each corresponding coordinate set to one another.

In any combination of the above embodiments, the instructions further cause the processor to communicate the at least one task to an application layer of a computing device, wherein communicating the at least one task to the application layer includes integrating the at least one task or the at least one task entity into a software application.

In any combination of the above embodiments, the command includes a calendar event, the at least one task entity includes an event description, the at least one task includes a calendar event integratable with a calendar software application, wherein communicating the at least one task to the application layer includes appending the calendar event to the calendar software application.

In any combination of the above embodiments, the instructions further cause the processor to: determine a second command of the image based on extracted text and extracted coordinates being applied to a machine learning model; determine a second entity associated with the second command based on the extracted text, the extracted coordinates, or both; and generate a second task, comprising the second entity, based on the second command.

In some embodiments, a computer-implemented method is provided. The computer-implemented method includes receiving an image comprising alphanumeric characters and non-alphanumeric-character objects; extracting, using a machine learning model, (i) text from the alphanumeric characters and (ii) spatial data from the alphanumeric characters and the non-alphanumeric-character objects, wherein (i) the text and (ii) the spatial data are associated with the machine learning model that is trained based on visual features associated with the text and based on spatial features associated with the spatial data; determining a command of the image based on the extracted text and the extracted spatial data being applied to the machine learning model; determining a task associated with the command, the determination based on at least one of the extracted text, the extracted spatial data, or the command; determining at least one task entity corresponding to the task, the determination based on at least one of the extracted text, the extracted spatial data, the task, or the command; and generating the task, comprising the corresponding task entity. Advantageously, these and other embodiments, as described herein, provide improved technologies to computer systems for providing assistance or productivity services by, among other aspects, enabling a computer system to infer a command from an image and determine or generate a task corresponding to the command for use by a computer productivity application or service. In this way, embodiments provide new, enhanced functionality for these computer productivity applications or services and also reduce computational resources that would be required from manual operation or creation of these tasks, and/or manually specifying task entities. Whereas existing approaches are unable to infer a command from an image, and at best are merely able to perform a targeted analysis for one purpose, the disclosed subject matter provides an improved technique for generating tasks and task entities based on a command predicted or determined from an image, allowing for analysis for a plurality of purposes (e.g., commands and intents). In this manner, generation of a task is improved and automated based on the command associated with the image, thereby reducing the time a computing device remains in operation to process manual user inputs.

In any combination of the above embodiments, the method further includes determining a second command of the image based on the extracted text and the extracted spatial data being applied to the machine learning model; determining a second task entity associated with the second command based on the extracted text, the extracted spatial data, or both; and generating a second task comprising the second task entity.

In any combination of the above embodiments, the method further includes communicating the task to an application layer of a computing device, wherein communicating the task to the application layer includes integrating, into a software application, at least one of the task or the at least one task entity.

In any combination of the above embodiments, the command includes a calendar event, the at least one task entity includes an event date, the task includes creating a calendar event integratable with a calendar software application, wherein communicating the task to the application layer includes adding the calendar event to an electronic calendar associated with the calendar software application.

Overview of Exemplary Operating Environment

Figure 9:
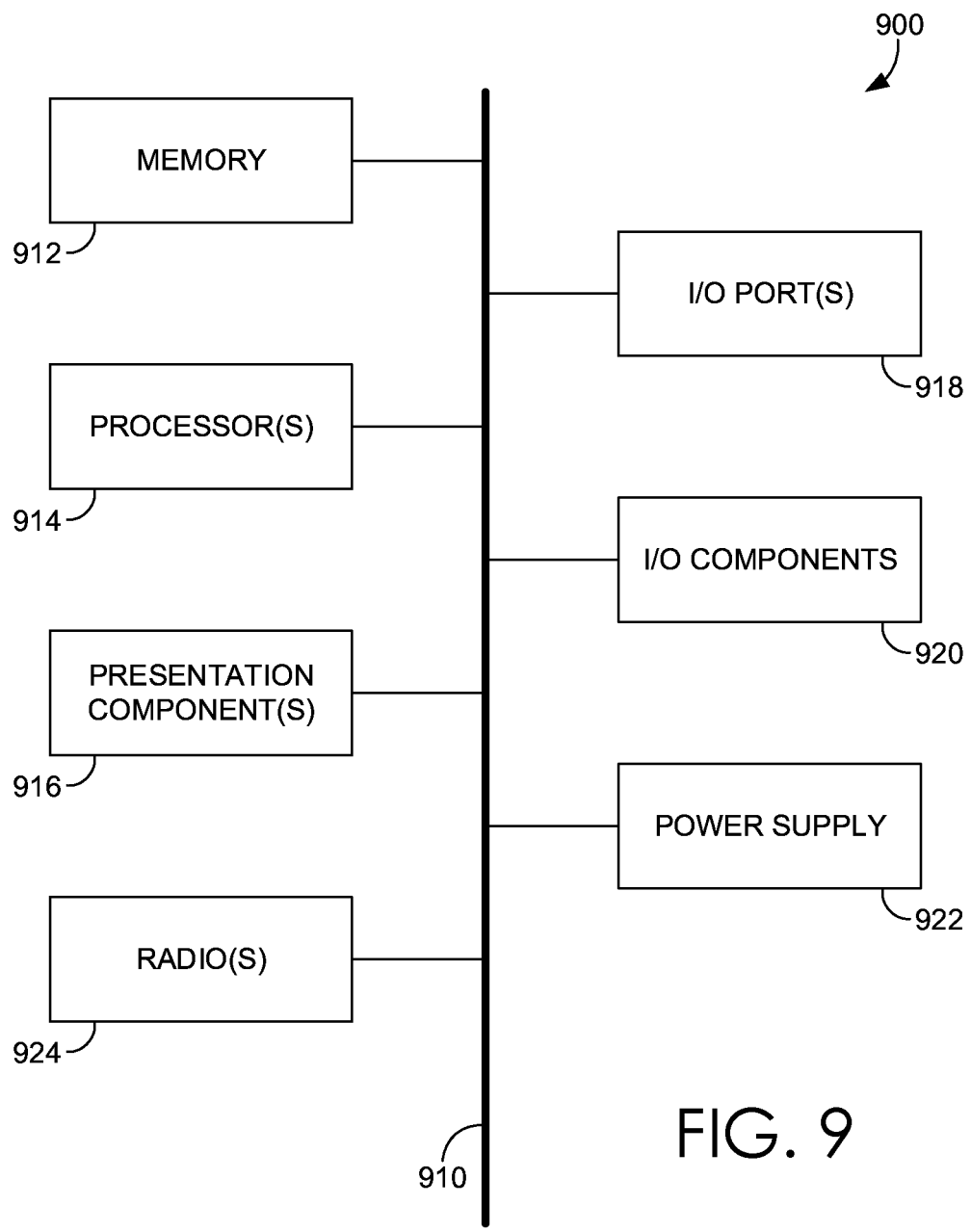
FIG. 9 is a block diagram of a computing device for which embodiments of this disclosure are employed.

Having described various embodiments of the disclosure, an exemplary computing environment suitable for implementing embodiments of the disclosure is now described. With reference to FIG. 9, an exemplary computing device is provided and referred to generally as computing device 900. The computing device 900 is but one example of a suitable computing environment and is not intended to suggest any limitation as to the scope of use or functionality of the disclosure. Neither should the computing device 900 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, or similar computing or processing devices. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more embodiments of the present disclosure. Distinction is not made between such categories as "workstation," "server," "laptop," "handheld device," or the like, as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may include computer storage median and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, and similar physical storage media. Computing device 900 includes one or more processors 914 that read data from various entities such as memory 912 or I/O components 920. Presentation component(s) 916 presents data indications to a user or other device. Exemplary presentation components include a display device, speaker, printing component, vibrating component, and the like.

The I/O ports 918 allow computing device 900 to be logically coupled to other devices, including I/O components 920, some of which may be built in. Illustrative components include, by way of example and not limitation, a microphone, joystick, game pad, satellite dish, scanner, printer, wireless device, and other I/O components. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, red-green-blue (RGB) camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a wireless local-area network (WLAN) connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Example Distributed Computing System Environment

Figure 10:
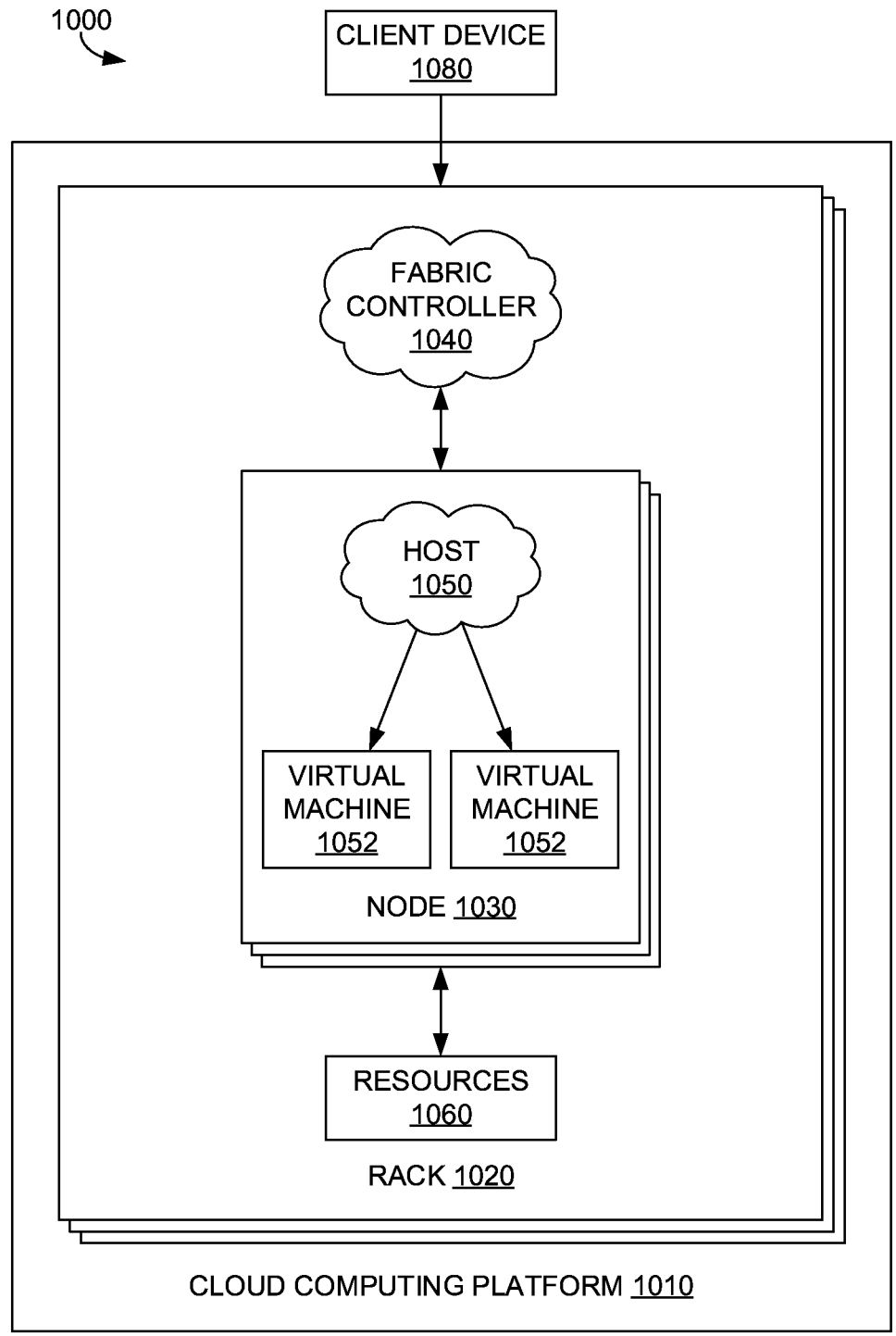
FIG. 10 is a block diagram of a computing environment in which embodiments of the present disclosure may be employed.

Referring now to FIG. 10, FIG. 10 illustrates an example distributed computing environment 1000 in which implementations of the present disclosure may be employed. In particular, FIG. 10 shows a high level architecture of an example cloud computing platform 1010 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 1000 that includes cloud computing platform 1010, rack 1020, and node 1030 (e.g., computing devices, processing units, or blades) in rack 1020. The technical solution environment can be implemented with cloud computing platform 1010 that runs cloud services across different data centers and geographic regions. Cloud computing platform 1010 can implement fabric controller 1040 component for provisioning and managing resource allocation, deployment, upgrade, and management of cloud services. Typically, cloud computing platform 1010 acts to store data or run service applications in a distributed manner. Cloud computing infrastructure 1010 in a data center can be configured to host and support operation of endpoints of a particular service application. Cloud computing infrastructure 1010 may be a public cloud, a private cloud, or a dedicated cloud.

Node 1030 can be provisioned with host 1050 (e.g., operating system or runtime environment) running a defined software stack on node 1030. Node 1030 can also be configured to perform specialized functionality (e.g., compute nodes or storage nodes) within cloud computing platform 1010. Node 1030 is allocated to run one or more portions of a service application of a tenant. A tenant can refer to a customer utilizing resources of cloud computing platform 1010. Service application components of cloud computing platform 1010 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1030, nodes 1030 may be partitioned into virtual machines (e.g., virtual machines 1052). Physical machines can also concurrently run separate service applications. The virtual machines or physical machines can be configured as individualized computing environments that are supported by resources 1060 (e.g., hardware resources and software resources) in cloud computing platform 1010. It is contemplated that resources can be configured for specific service applications. Further, each service application may be divided into functional portions such that each functional portion is able to run on a separate virtual machine. In cloud computing platform 1010, multiple servers may be used to run service applications and perform data storage operations in a cluster. In particular, the servers may perform data operations independently but exposed as a single device referred to as a cluster. Each server in the cluster can be implemented as a node.

Client device 1080 may be linked to a service application in cloud computing platform 1010. Client device 1080 may be any type of computing device, such as user device 102a described with reference to FIG. 1, and the client device 1080 can be configured to issue commands to cloud computing platform 1010. In embodiments, client device 1080 may communicate with service applications through a virtual Internet Protocol (IP) and load balancer or other means that direct communication requests to designated endpoints in cloud computing platform 1010. The components of cloud computing platform 1010 may communicate with each other over a network (not shown), which may include, without limitation, one or more local area networks (LANs) and/or wide area networks (WANs).

Many different arrangements of the various components depicted, as well as components not shown, are possible without departing from the scope of the claims below. Embodiments of the present disclosure have been described with the command to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system, the computerized system comprising:
   at least one computer processor; and
   computer memory storing computer-readable instructions that, when used by the at least one computer processor, cause the at least one computer processor to perform operations comprising:
   receiving an image comprising at least an indication of non-alphanumeric-character objects;
   extracting image data for the image based on at least the non-alphanumeric-character objects to produce a plurality of image data features;
   determining, by a machine learning model, an image context based on a first image data feature of the plurality of image data features, wherein the image context defines a relationship between alphanumeric characters depicted in the image and the non-alphanumeric-character objects;
   determining a command associated with the image based on a second image data feature in the plurality of image data features;
   determining at least one task corresponding to the command based on at least one of: the command, the first image data feature, the image context, and the second image data feature;
   based on the at least one task and the plurality of image data features, determining at least one task entity; and
   generating the at least one task, comprising the at least one task entity and configured for use in a computer productivity application.

2. The computerized system of claim 1, wherein the command is determined based on the machine learning model that is trained using a plurality of images comprising the alphanumeric characters and the non-alphanumeric-character objects.

3. The computerized system of claim 1, wherein the image further comprises an indication of the alphanumeric characters, and wherein the plurality of image data features comprise visual features associated with text corresponding to the alphanumeric characters and spatial features associated with coordinates associated with and relating the alphanumeric characters and the non-alphanumeric-character objects.

4. The computerized system of claim 1, wherein the image further comprises an indication of the alphanumeric characters, and the operations further comprising determining a corresponding coordinate set for each alphanumeric character and for each non-alphanumeric-character object, wherein the command is determined based on the second image data feature indicative of a comparison of each corresponding coordinate set to one another.

5. The computerized system of claim 1, wherein the operations further comprise communicating the at least one task to an application layer of a computing device, wherein communicating the at least one task to the application layer comprises integrating the at least one task or the at least one task entity into a software application.

6. The computerized system of claim 5, wherein the command comprises a calendar event, the at least one task entity comprises a calendar event description, the at least one task comprises creating the calendar event integratable with the software application, wherein communicating the at least one task to the application layer comprises adding the calendar event to an electronic calendar associated with the software application.

7. The computerized system of claim 1, wherein the operations further comprise:
   determining a second command of the image based on extracted text and extracted coordinates being applied to the machine learning model;
   determining a second task based on at least one of the second command;
   determining a second task entity associated with the second task based on the extracted text, the extracted coordinates, or both; and
   generating the second task, comprising the second task entity.

8. The computerized system of claim 1, wherein determining the command of the image comprises determining that the image comprises at least one of: a recipe, a scheduled event, a list of items.

9. The computerized system of claim 1, wherein the image comprises a digital video or computer animation, and wherein the plurality of image data features comprise time-sensitive spatial image features and visual image features.

10. At least one computer-storage media having computer-executable instructions embodied thereon that, when executed by a computing system having a processor and memory, cause the processor to:
    receive an image comprising alphanumeric characters and non-alphanumeric-character objects;
    extract image data for the image based on the alphanumeric characters and the non-alphanumeric-character objects to produce a plurality of image data features;
    determining a relationship between the alphanumeric characters and the non-alphanumeric-character objects based on a first image data feature of the plurality of image data features;
    determine a command associated with the image based on a second image data feature in the plurality of image data features;
    determine at least one task corresponding to the command based on at least one of: the command, the first image data feature, the second image data feature, and the relationship between the alphanumeric characters and the non-alphanumeric-character objects;

based on the at least one task and the plurality of image data features, determine at least one task entity; and generate the at least one task, comprising the at least one task entity and configured for use in a computer productivity application.

11. The computer-storage media of claim 10, wherein the plurality of image data features comprise visual features associated with text corresponding to the alphanumeric characters and spatial features associated with coordinates associated with and relating the alphanumeric characters and the non-alphanumeric-character objects.

12. The computer-storage media of claim 10, wherein the instructions further cause the processor to determine a corresponding coordinate set for each alphanumeric character and for each non-alphanumeric-character object, wherein the command is determined based on the second image data feature indicative of a comparison of each corresponding coordinate set to one another.

13. The computer-storage media of claim 10, wherein the instructions further cause the processor to communicate the at least one task to an application layer of a computing device, wherein communicating the at least one task to the application layer comprises integrating the at least one task or the at least one task entity into a software application.

14. The computer-storage media of claim 13, wherein the command comprises a calendar event, the at least one task entity comprises an event description, the at least one task comprises the calendar event integratable with the software application, wherein communicating the at least one task to the application layer comprises appending the calendar event to the software application.

15. The computer-storage media of claim 10, wherein the instructions further cause the processor to:

determine a second command of the image based on extracted text and extracted coordinates being applied to a machine learning model;

determine a second entity associated with the second command based on the extracted text, the extracted coordinates, or both; and generate a second task, comprising the second entity, based on the second command.

16. A computer-implemented method, comprising:

receiving an image comprising alphanumeric characters and non-alphanumeric-character objects;

extracting, using a machine learning model, (i) text from the alphanumeric characters and (ii) spatial data from the alphanumeric characters and the non-alphanumeric-character objects, wherein (i) the text and (ii) the spatial data are associated with the machine learning model that is trained based on visual features associated with the text and based on spatial features associated with the spatial data;

determining, by the machine learning model, an image context based on the visual features and the spatial features, wherein the image context defines a relationship between the alphanumeric characters and the non-alphanumeric-character objects depicted in the image;

determining a command of the image based on the extracted text and the extracted spatial data being applied to the machine learning model;

determining a task associated with the command based on at least one of: the extracted text, the extracted spatial data, the command, and the image context;

determining at least one task entity corresponding to the task based on at least one of the extracted text, the extracted spatial data, the task, or the command; and generating the task, comprising the at least one task entity.

17. The computer-implemented method of claim 16, further comprising:

determining a second command of the image based on the extracted text and the extracted spatial data being applied to the machine learning model;

determining a second task entity associated with the second command based on the extracted text, the extracted spatial data, or both; and generating a second task comprising the second task entity.

18. The computer-implemented method of claim 16, further comprising communicating the task to an application layer of a computing device, wherein communicating the task to the application layer comprises integrating, into a software application, at least one of the task or the at least one task entity.

19. The computer-implemented method of claim 18, wherein the command comprises a calendar event, the at least one task entity comprises an event date, the task comprises creating the calendar event integratable with the software application, wherein communicating the task to the application layer comprises adding the calendar event to an electronic calendar associated with the software application.

* * * * *